United States Patent Office 3,473,286
Patented Oct. 21, 1969

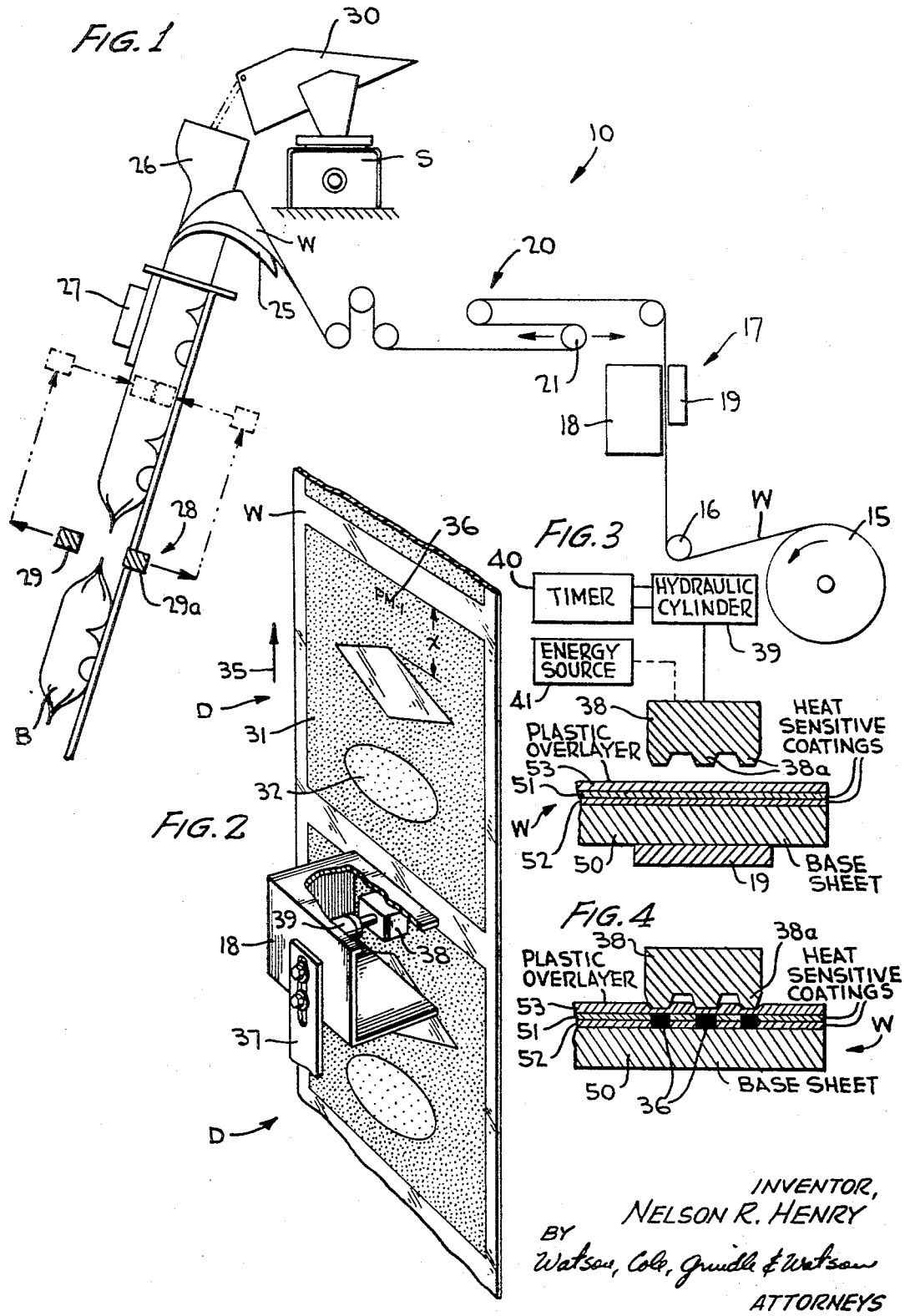

3,473,286
PACKAGING WITH CODE DATING
Nelson R. Henry, Decatur, Ga., assignor to The Woodman Company, Inc., Decatur, Ga., a corporation of Georgia
Filed June 5, 1967, Ser. No. 643,570
Int. Cl. B65b 61/02, 9/04, 61/26
U.S. Cl. 53—14          2 Claims

ABSTRACT OF THE DISCLOSURE

A method of packaging with code dating by forming indicia on a precoated area of heat sensitive coating of the package, said indicia being discernible by a resulting contrast in color of said coating. Two layers of coating of diverse colors may be utilized with some physical and/or chemical interaction between the layers and the coating may be in the form of the package dress.

---

The present invention relates to packaging and, more particularly, to packaging products with code dating of the packages as each package is filled.

In the packaging industry it is necessary, when operating on products or goods subject to spoilage or expiration, to make notation on the packages containing the products indicating certain information, which usually consists of the time and location where the package was filled or the expiration date of the product. For example, food products, such as potato chips, must be code dated so that they can be monitored on the supermarket shelf to insure freshness, and, similarly, individually packaged medicines and films must be code dated to enable the same to be monitored to make certain that the product is used within the prescribed period when it retains its full effectiveness.

Many systems and methods have been devised to be combined with the packaging operation so that the code dating of the package is performed at the same time as the packaging operation. These methods have in the past employed printing or stenciling operations with ink being applied directly to the package in the form of the indicia indicating the necessary information. These prior art arrangements have left much to be desired in that they require the supply of liquid ink through a system which must be constantly serviced from day to day. Furthermore, problems of drying are encountered when printing on nonabsorbent materials so that there is a definite limitation on the speed at which the packaging machine may operate.

More recently, code dating systems have been developed which utilize tapes with colored, thermoplastic coatings, a portion of which coating is transferred to the package by a heated die having raised indicia for each code dating operation. This type of system is shown for example by the patent to Gottscho et al. 3,244,092, issued Apr. 5, 1966, and while this arrangement has been proven to be successful it has been found that there is considerable expense in providing an expendable tape and the necessary auxiliary equipment for feeding the same past the heated die.

In some cases where the packaging cycles occur in rapid succession, such as in the modern continuous form and fill machines where the cycle time is of the order of two seconds or less, there has also been encountered the problem of breaking of the tape by the equipment due to the high tension resulting from the rapid advancement of said tape in readiness for the next printing cycle. Further, some difficulty has arisen in obtaining secure placement of this type of coated indicia on some packages, such as potato chip bags, since these have an overlayer of plastic that prevents a good bond from being made between the coating from the tape and the plastic overlayer.

Thus, an object of the present invention is to provide an improved method of code dating packages to overcome the foregoing objections wherein the necessary code dating is perfromed without the use of ink devices or expendable tape.

It is another object of the present invention to provide a method of packaging with code dating that is particularly capable of rapid successive operations, for example in modern form and fill machines.

It is still another object of the present invention to provide a method as described wherein code dating is effected solely by the application of heat to a heat sensitive coating on the package whereby the prior art step of applying the ink to the die or advancing the tape is eliminated.

Thus, in accordance with the present invention, each package is provided with a precoated area of heat sensitive coating, the packages are fed past a coding station, and heat is applied in the form of indicia to the precoated area whereby to cause a change or contrast in the color of said coating corresponding to the indicia. The heat sensitive coating is or may be any of the several products which are presently known, such as aromatic amines, as disclosed in detail in the patent to Sahler 3,097,297, issued July 9, 1963, or co-crystal adducts of bisphenols, as disclosed for example in the patent to Baumann 3,185,583, issued May 25, 1965. The heat applying step in the preferred embodiment is performed by a conventional die with raised indicia supplied with the necessary energy, which die is held near to or in contact with the package for a suitable dwell time to cause the coating to change color. It will be realized that with this arrangement there is no need for the expensive tapes and equipment which have been required in prior are arrangements, such as shown by the Gottscho patent. Also, the method of the present invention accomplishes the code dating operation through application of heat that permanently marks the indicia on a precoated area of heat sensitive coating on the package without causing a physical change in the base sheet of the package thereby insuring a permanent marking of the package without weakening the same in any way.

Other aspects of the method of the present invention include the provision of the heat sensitive coating in at least two layers of diverse colors whereby upon the application of heat a physical interaction between layers occurs thereby effecting or contributing to the color change for the coding. In other words, by providing two distinct layers, preferably the upper layer being a dark color and the lower layer a light color, the code indicia appears as an intermediate color after a physical intermixing for easy recognition. Furthermore, it is contemplated that in the preferred embodiment the heat sensitive precoated area is provided by the normal dress of the package whereby no special registration problems or special coated areas are needed to carry out the invention.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is an overall schematic diagram of a form and fill packaging machine suitable for performing the several steps of the method of the present invention;

FIGURE 2 is an enlarged detailed perspective view of the coding station of the machine illustrated in FIGURE 1;

FIGURE 3 is an enlarged cross-sectional view of the web representing successive packages prior to code dating; and FIGURE 4 is a cross-sectional view of the web of FIGURE 3 after energy has been applied to effect the code dating.

With specific reference now to FIGURE 1 of the drawings, there is illustrated a continuous form and fill machine, generally designated by the reference numeral 10, with which the code dating method of the present invention is particularly adapted to be used. As is well known in the art, a machine of this type is capable of rapidly forming successive bags B from a continuous web W; said bags B being automatically filled with a food product such as potato chips at the final sealing station. To meet the desired requirement of forming and filling the maximum number of bags per unit of time, it has been found to be possible to operate the machine 10 on complete cycles of two seconds or less. Thus, as will be noted, the method of the present invention lends itself particularly well to incorporation with the rapid operation of form and fill machines; however, it should be pointed out that in accordance with the broader aspects of the present invention, the method can be utilized to advantage to operate with other packaging methods and on other types and forms of packages, if desired.

Thus, to give a clear understanding of the form and fill machine 10 so as to show one preferred embodiment of the present invention, there is provided a supply roll 15 for paying out the web W which is directed about a turning roller 16 for feeding past a code dating station 17, at which the code dating operation of the present invention takes place. The station 17 includes a coder assembly 18 and a back-up member 19, which may itself be of conventional construction, as will be discussed in detail later.

After passing through the coding station 17, the web is directed through a series of guide rollers 20, one of which is an adjustable roller 21 that can be moved in a horizontal direction as indicated by the arrows, for registering the web W at the coding station 17. From this position, the web W is passed over a conventional mandrel former 25 which serves to form the web W into a continuous tube about a tube filler 26. A heated die 27 serves to join the opposite lateral edges of the web W just prior to the tube reaching sealing station 28, where the reciprocating jaws 29, 29a are effective to form transverse seals across the continuous tube and concurrently feed the web W in an intermittent fashion (note movement denoted by dotted line positions of jaws 29, 29a).

Just prior to the formation of each bag B, product is supplied by gravity through the filler 26, as a result of successive batches being dumped in a timed fashion from a weighing hopper 30, which is supported in the usual manner on a scale S. In this arrangement it will be noted that the coding station 17 is spaced a considerable distance from the sealing station 28 at which the bag B is formed whereby the coding is actually taking place on the web W prior to the final formation into the bag B. This means that the indicia formed have sufficient time to set prior to the formation of the bag B; however, it should be understood that the coding operation and methods of the present invention can be successfully carried out at other positions in the overall packaging operation as desired.

The web W, which is used in the form and fill machine 10 in accordance with the preferred embodiment of the present invention, is shown in FIGURE 2 wherein successive packages are designated by individual package dress D. As is conventional, the dress D may include a background 31 of one color, any number of inserts of another color as exemplified by oval insert 32, and a window 33 through which the product may be viewed. The intermittent feed of the web W in an upward direction past the coding station 17 is noted by arrow 35 in this figure, and the coder assembly 18 is automatically actuated to cause the formation of code indicia 36 on the background 31 of each package, as will presently be described.

As is apparent in FIGURE 2, the coder assembly 18 may be mounted on any convenient support 37 from the frame of the machine 10, and preferably comprises a reciprocal die 38 with raised indicia 38a (note FIGURE 3), which is given its movement toward and away from the web W by means of a suitable actuating means, such as pneumatic cylinder 39. As shown in FIGURE 3, the cylinder 39 is controlled by a conventional timer 40 which may be adjusted to obtain the proper dwell time, which is of considerable importance, as will later appear. The die 38 is also provided with a suitable energy source 41, which can also be of conventional design, such as an electrically heated element embedded in the die 38 itself.

The cross-sectional construction of the web W, on which the code dating operation of the present invention is performed, is best shown in FIGURES 3 and 4 of the drawings wherein it can be seen that a base sheet 50 has applied thereon upper and lower heat sensitive coatings 51, 52, which form the background 31 and the insert 32 of the dress D, respectively. Positioned over the coating 51 is a plastic overlayer 53 of polyethylene, polypropylene, or the like, which serves to enhance the protection of the product in the finished package. The base sheet 50 is preferably cellophane or specially treated fibrous paper, which is mainly designed to protect the particular product in the package but also serves to give the package the desired body. The heat sensitive coatings 51, 52 may be selected from a number of chemical compositions that change color upon being subjected to heat, such as aromatic amines and co-crystal adducts of bisphenols, as mentioned above.

Preferably, the coatings are selected from those which are resesponsive to temperatures below the melting temperature of the plastic overlayer 53 so that when the die 38 is moved into pressure contact with the web W against the back-up member 19 as illustrated in FIGURE 4, said plastic overlayer 53 remains intact for maximum protection of the contents and the heat is thus transmitted from the raised indicia 38a through said plastic overlayer 53 to the upper heat responsive coating 51. As the heat from the raised indicia 38a is transferred to the coating 51, the same changes color through a chemical reaction in accordance with its characteristics whereby upon removal of the die 38 the code indicia 36 is left permanently marked on the web W by the resulting color contrast. As noted in FIGURE 4, in the preferred arrangement the lower heat responsive coating 52 is also affected, which gives further distinctness and legibility to the resulting contrasting indicia 36 for easy reading.

In accordance with another advantage of the present invention, the coatings 51, 52 can be selected to be of diverse color, as is customarily done to give attractiveness to the dress D and upon heating of the coatings 51, 52 there will take place in addition to or in lieu of the chemical change mentioned above, a physical interaction between the two colors to produce the resulting code indicia 36. In other words, as the coatings 51, 52 are heated, there may be an amount of bleeding through and/or combining of the two colors to thus form the code indicia 36 of an intermediate color that thus has the desired contrast to the upper coating 51.

The adjustment of the timer 40 is set to control the dwell time of the die 38 in the operative position of FIGURE 4, so that the die 38 is withdrawn before the heat has penetrated in any significant amount to the base sheet 50 whereby the web W does not undergo any physical change or scorching which would otherwise weaken the strength of the resulting bags B formed in the machine 10. Furthermore, the adjustment of the energy source 41 is made in accordance with the selected dwell time and the particular construction and materials of the web W.

It should now be realized that the code dating operation of the present invention completely eliminates any step required for inking of the die or feeding of tape whereby the operation of the packaging machine 10 is not hindered. Also, it should be noted that the indicia 36 are conveniently formed directly on the dress D of the package so that no additional coated area is needed for this purpose. In addition, with the arrangement wherein the indicia are formed directly on the dress of the package, there is no special requirements for registration since formation of the indicia 36 within a considerable range, as noted, for example, by distance X in FIGURE 2, is acceptable.

In accordance with certain obvious modifications of the method within the spirit and scope of the present invention, it should be noted that the energy source 41 may be of any type readily available for the purpose of supplying controlled heat to the coatings 51, 52, and might for example, take the form of ultrasonic vibrations, infrared energy, or other conventional sources of heat. While, as pointed out above, it is not necessary to employ operating temperatures that are sufficiently high to melt the plastic in the area of the indicia 36 to carry out the invention, the use of such temperatures for this purpose is deemed to be within the broader scope of the invention. With the overlayer 53 so selectively removed, the indicia 36 assume an embossed appearance which may be desirable for improved legibility. It will be realized that in some cases, the die 38 may not have to be brought into direct contact with the web W but may be effective with a slight spacing therefrom. Furthermore, it is contemplated that the die 38 could under certain circumstances be effective to supply the necessary color changing heat to the coatings 52, 51 by application to the reverse or the base sheet side of the web W. Also, of course, the code dating in accordance with the method of the present invention could be performed on a single coating as exists in the oval area of the package dress in FIGURE 2, if desired.

In this disclosure, there is shown and described only the preferred embodiment of the invention, but, as aforementioned, it is to be understood that the invention is capable of various changes or modifications within the scope of the inventive concept as expressed by the accompanying claims.

I claim:

1. The method of packaging with code dating comprising the steps of providing a continuous web having precoated areas of heat sensitive coating representing individual bags to be formed, intermittently feeding said web to define successive packaging cycles, forming said web into successive bags during each packaging cycle, filling each of said bags thus formed with product during each packaging cycle, and applying heat in the form of indicia to said web at said precoated area during each packaging cycle whereby to cause a change in said coating indicated by a resulting contrast in color to effect coding with said indicia of each successive bag filled, said heat sensitive coating including at least two layers of diverse colors, said heat being applied during the coding operation to one of the layers, said heat being sufficient to cause at least some heating of the other layer whereby said indicia are formed by at least some physical interaction between said layers.

2. The method of code dating a series of packages comprising the steps of providing each package with a precoated area of heat sensitive coating, feeding said packages past a coding station and applying heat in the form of indicia at said precoated area at said coding station whereby to cause a change in said coating indicated by a resulting contrast in color of the portion of said area corresponding to said indicia to effect a coding of each package, said heat sensitive coating including at least two layers of diverse colors, said heat being applied during the coding operation to one of the layers, said heat being sufficient to cause at least some heating of the other layer whereby said indicia are formed by at least some physical interaction between said layers.

References Cited

UNITED STATES PATENTS 3,293,824  12/1966  Dorr _____ 53—131
3,392,501   7/1968  Gilchrist _____ 53—131 X THERON E. CONDON, Primary Examiner E. F. DESMOND, Assistant Examiner U.S. Cl. X.R.

53—28, 131